(12) United States Patent  
Saparoff

(10) Patent No.: US 7,912,950 B1  
(45) Date of Patent: Mar. 22, 2011

(54) ADAPTIVE POLLING FACILITY FOR NETWORK MONITORING SYSTEM

(75) Inventor: Nicholas W. Saparoff, Franklin, MA (US)

(73) Assignee: ByteSphere Technologies, LLC, Franklin, MA (US)

( * ) Notice: Subject to any disclaimer, the term of this patent is extended or adjusted under 35 U.S.C. 154(b) by 147 days.

(21) Appl. No.: 12/169,857

(22) Filed: Jul. 9, 2008

Related U.S. Application Data

(60) Provisional application No. 60/948,543, filed on Jul. 9, 2007.

(51) Int. Cl.  
*G06F 15/173* (2006.01)

(52) U.S. Cl. .......................... 709/224; 709/223; 709/226

(58) Field of Classification Search .................. 709/223, 709/224, 226  
See application file for complete search history.

(56) References Cited

U.S. PATENT DOCUMENTS

| | | | |
|---|---|---|---|
| 6,728,768 B1 * | 4/2004 | Carney ........................... | 709/224 |
| 7,688,838 B1 * | 3/2010 | Aloni et al. .................... | 370/412 |
| 2001/0039580 A1 * | 11/2001 | Walker et al. ................. | 709/224 |
| 2002/0062366 A1 * | 5/2002 | Roy et al. ...................... | 709/224 |
| 2002/0087680 A1 * | 7/2002 | Cerami et al. ................. | 709/224 |
| 2004/0199626 A1 * | 10/2004 | Nuggehalli .................... | 709/224 |
| 2005/0228885 A1 * | 10/2005 | Winfield et al. .............. | 709/226 |
| 2007/0294392 A1 * | 12/2007 | Balasubramanian et al. | 709/224 |
| 2009/0293051 A1 * | 11/2009 | Krywaniuk .................... | 717/173 |

* cited by examiner

*Primary Examiner* — Wing F Chan  
*Assistant Examiner* — Kostas Katsikis  
(74) *Attorney, Agent, or Firm* — Nelson Mullins Riley & Scarborough LLP; John S. Curran, Esq.

(57) ABSTRACT

An adaptive polling facility that dynamically determines which types of management objects are available for monitoring the functioning of a network element is discussed. Based on the availability determination, subsequent polling requests are adapted. The dynamic adaptation allows partial information to be collected and used in certain circumstances and saves polling communications directed to non-supported objects. The adaptive polling facility may adjust to poll one object over another based upon current values retrieved from the device or may poll based on the presence or absence of an object. The adaptation of the polling requests may include changing the rate of the polling requests based on the speed of the device response and number of queued requests, interleaving the requests for several devices and/or switching the requests from one device to another if the first device is too busy.

14 Claims, 6 Drawing Sheets

US 7,912,950 B1

ADAPTIVE POLLING FACILITY FOR NETWORK MONITORING SYSTEM

RELATED APPLICATION

This application claims the benefit of a pending United States Provisional Application entitled "Adaptive Polling Facility for Network Monitoring System" filed on Jul. 9, 2007, application No. 60/948,543.

FIELD OF THE INVENTION

The embodiments of the present invention relate generally to the monitoring of network elements and more particularly to an adaptive polling facility used in monitoring the network elements.

BACKGROUND

In order to monitor a physical or logical element on a network a network monitoring system collects information about the functioning of the network elements. The process of determining how a network element is functioning is referred to as "polling" and the software entity performing the determination is referred to as a "poller". The polling works on a request-response basis with the poller sending requests ("polls") to the network element (or an agent representing the network element) requesting certain types of information and the network element or agent representing the network element responding (or not responding) to the request with a response that contains all, some or none of the requested information. The collected information, such as performance statistics and settings for the network element, is usually held in specialized objects (e.g.: Management Information Base (MIB) objects) with different network elements supporting different types of objects.

BRIEF SUMMARY

The embodiments of the invention provide an adaptive polling facility that dynamically determines which objects are available for monitoring the functioning of a network element and which are not available. Based on the availability determination, subsequent polling requests are adapted. The dynamic adaptation allows partial information to be collected and used in certain circumstances and saves polling communications directed to non-supported objects. The adaptive polling facility may adjust to poll one object over another based upon current values retrieved from the device or may poll based on the presence or absence of an object. The adaptation of the polling requests may include changing the rate of the polling requests based on the speed of the device response and number of queued requests, interleaving the requests for several devices and/or switching the requests from one device to another if the first device is too busy.

BRIEF DESCRIPTION OF THE DRAWINGS

The invention is pointed out with particularity in the appended claims. Some of the advantages of the invention may be better understood by reference to the following description taken in conjunction with the accompanying drawings, in which:

DETAILED DESCRIPTION

Embodiments of the present invention allow a network monitoring system to maximize the amount of information being collected without throwing errors or slowing down polls looking for missing information. The use of the adaptive polling facility described herein also minimizes the number of customizations that need to be made to the configuration files of the Network Monitoring System (NMS). The adaptive polling facility enables the NMS to have a small number of flexible configuration files rather than a larger number of predetermined configuration files. The adaptive polling facility also maximizes the speed at which objects may be polled.

Figure 1:
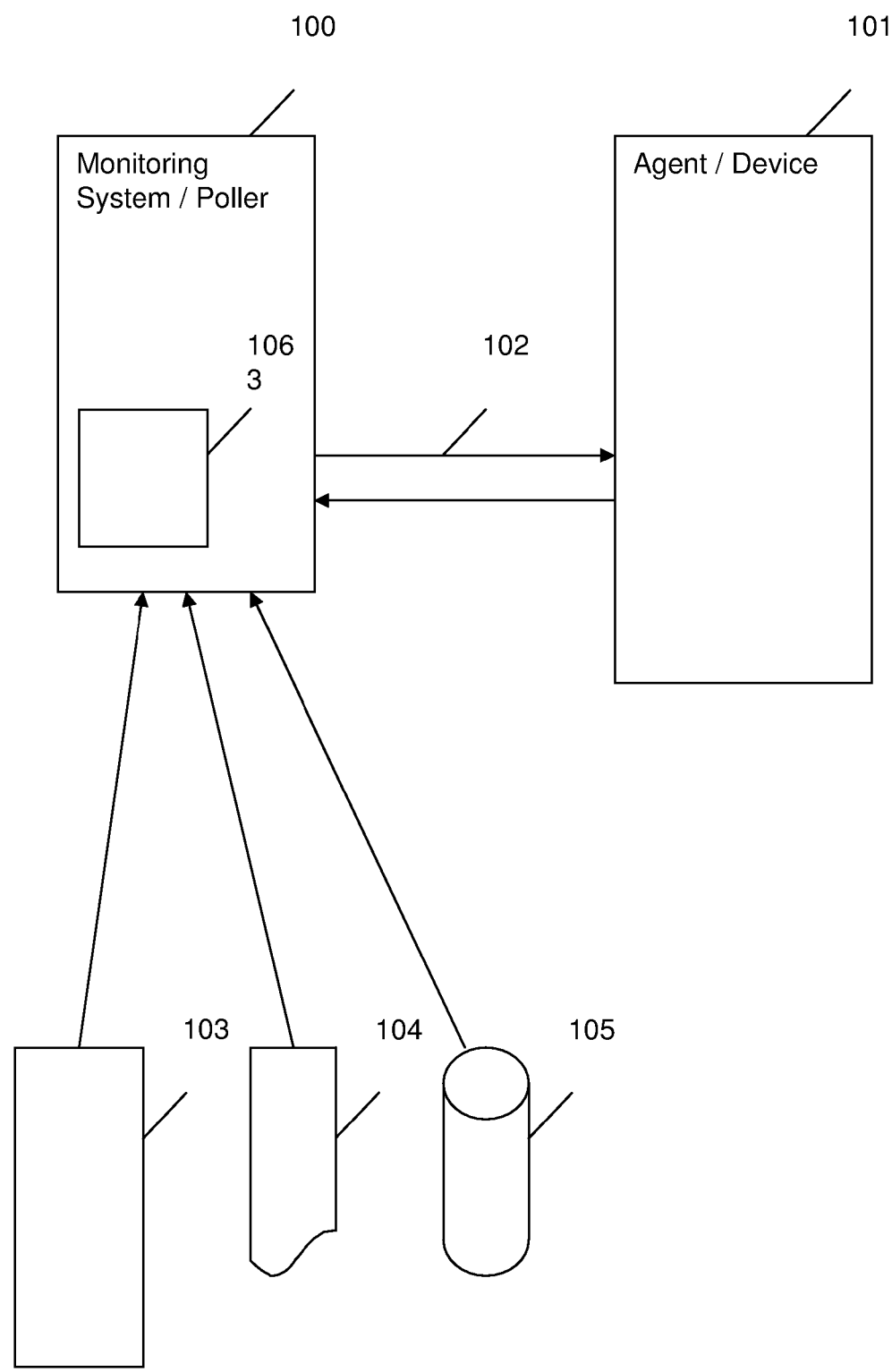
FIG. 1 depicts an environment suitable for practicing an embodiment of the present invention.

FIG. 1 depicts an environment suitable for practicing an embodiment of the present invention. The NMS uses a poller (100) to collect information about network elements. Pollers need to be told exactly what information to poll from the agent, and they do this by reading a set of instructions on how to poll management objects holding performance information for a network element, which management objects to poll, and which agents or devices (101) from which to poll them. The polling configuration can by acquired in a variety of ways including a configuration received from another monitoring or management station (103), a file on disk (104), a database (105), or internally in memory (106). As noted above, the communication between the poller (100) and the agent or device (101), is called a "poll" (102). This communication or poll (102) includes at least one request for information from the poller (100) and the agent (101). Conventionally, if all of the information requested by the poller (100) can not be supplied by the agent (101), or the response is not in a specific format, the poller (100) labels the poll (102), a "bad poll", and the information is ignored, resulting in loss of all the data collected about the network element that was returned by the agent for that poll.

Figure 2:
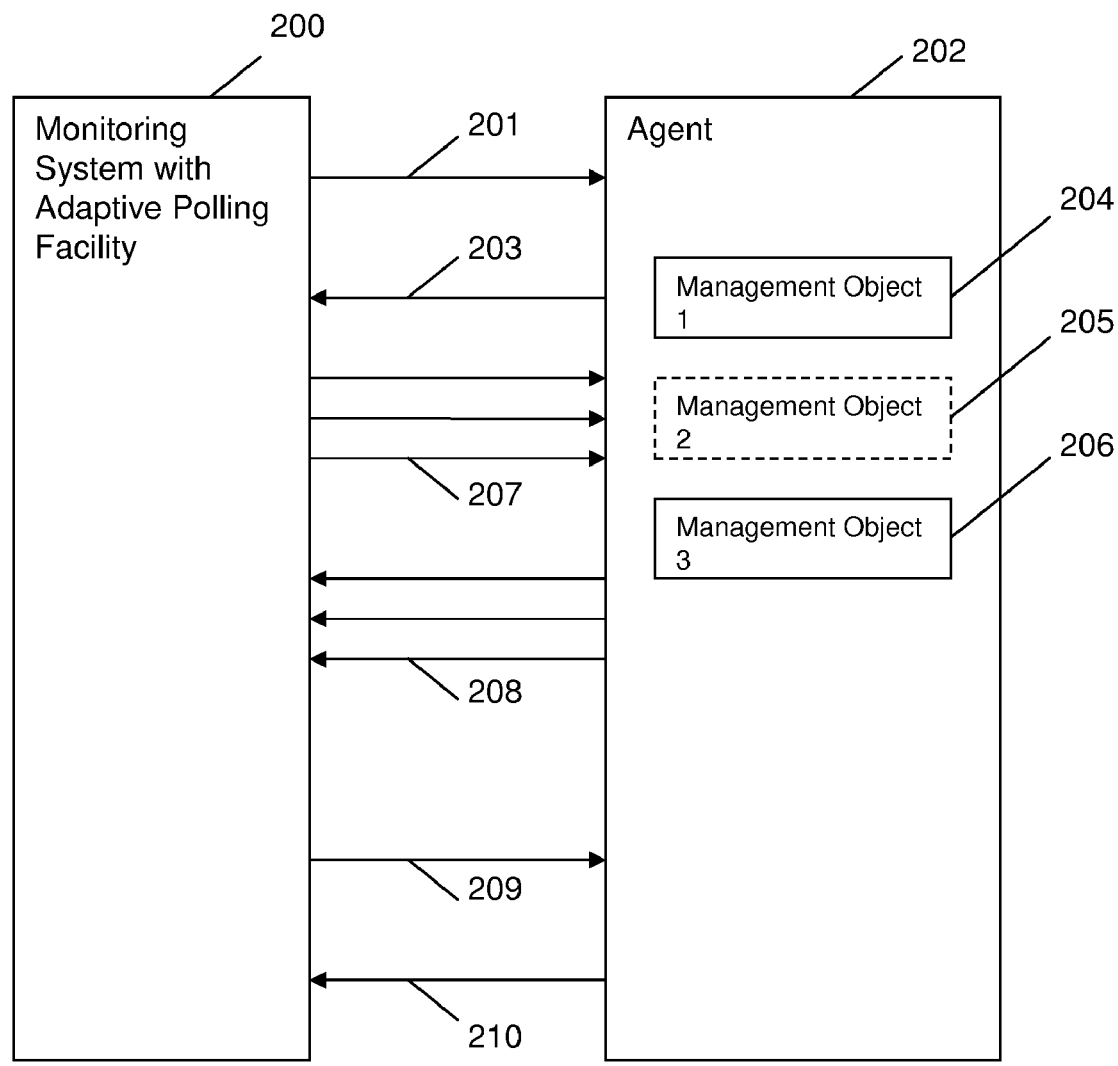
FIG. 2 depicts a block diagram of an exemplary network monitoring system communicating with an agent for a network element.

FIG. 2 depicts an exemplary network monitoring system communicating with an agent for a network element. The adaptive polling facility used by the embodiments of the present invention allows the monitoring system (200) to selectively choose which management objects to poll and adjusts what is actually polled depending on what the agent returns in the response. With regard to FIG. 2, a network monitoring system implementing adaptive polling (200) makes an initial "adaptive" request (201) to agent (202) for different types of management objects (e.g.: management object 1 (204), management object 2 (205), and management object 3 (206)) that relate to the performance of the network element represented by the agent. The agent (202) may not support all the requested types of management objects. If for example, the agent (202) does not support management object 2 (205), the agent may behave in a variety of ways including returning nothing, returning an empty response (203), or returning a response (203) with valid answers only for management object 1 (204) and management object 3 (206). If the network monitoring system with the adaptive polling facility (200) receives no response it may respond in a number of ways. The adaptive polling facility (200) may automatically re-query the agent (202) for each management object individually (207). It may then process the three individual responses (208) (or lack thereof), to determine which management objects the agent (202) supports. The adaptive polling facility (200) may then create a subsequent request (209) to query just for the variables that the agent (202) supports (such as in the above example, management objects 1 and 3), which should result in a good response (210).

Alternatively, if the adaptive polling engine receives a response (203) with some of the information populated, it can directly determine by a process of elimination which type of management objects in the original query (201) that the agent (202) supports, and create the subsequent query (209) without the intermediate step of using individual queries (207) and responses (208). This heuristic can be applied to other access methods in order to "adaptively" learn the types of management objects that are supported by the agent. This ability enables the adaptive polling facility (200) to tailor the queries put forth in the original configuration of the network monitoring system so as to create a "custom" query for items monitored by the agent (202).

Figure 3:
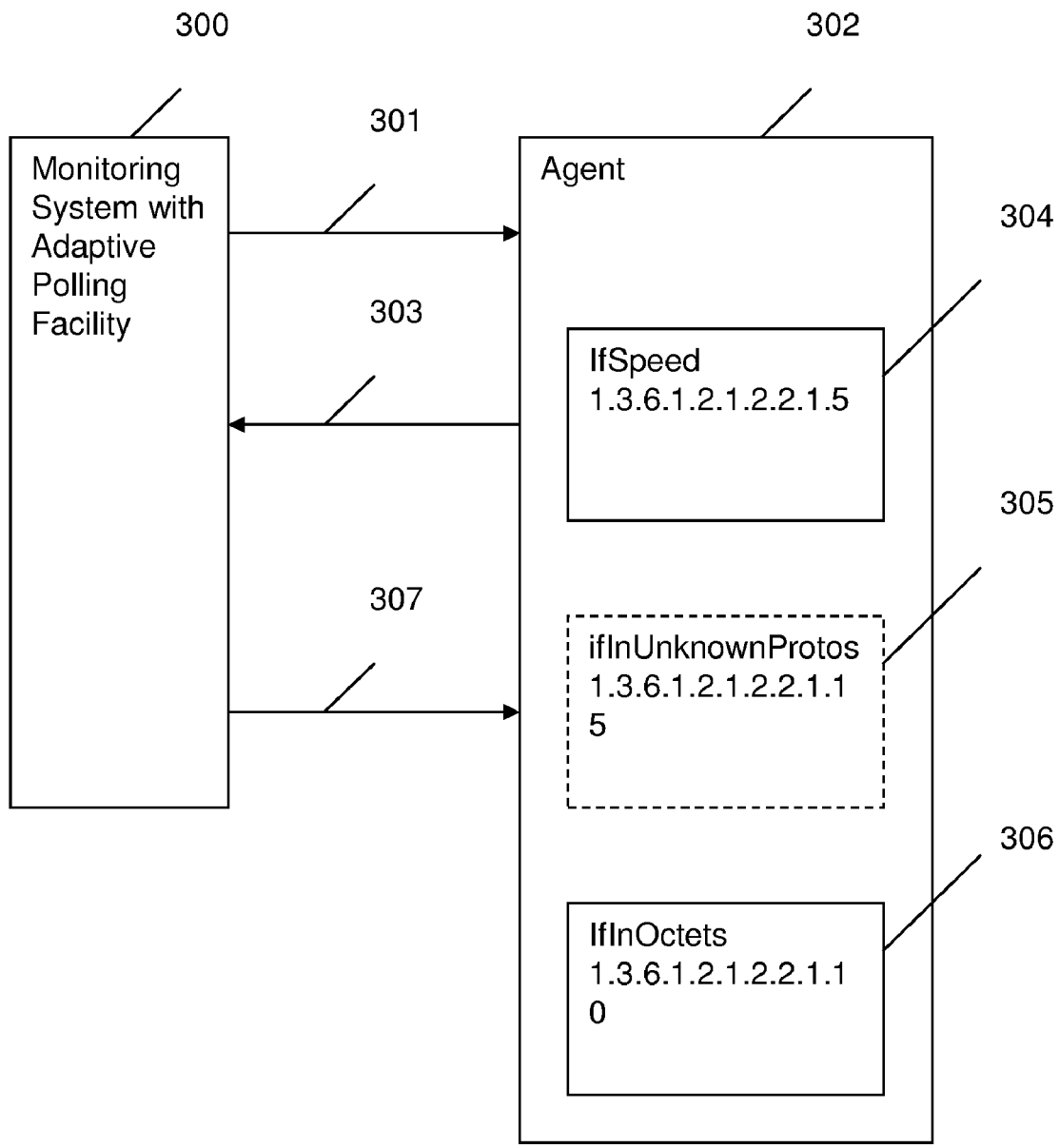
FIG. 3 depicts an exemplary SNMP request to an agent.

FIG. 3 depicts an example of the adaptive polling facility using the Simple Network Management Protocol (SNMP). A network monitoring system with an adaptive polling facility may use an SNMP GETNEXT request to determine which management objects are supported by the agent. The monitoring system (300) may create a request (301) for agent (302), that includes a request for the management objects IfSpeed (304), ifInUnknownProtos (305), and IfInOctets (306), where ifSpeed represents the speed of the interface, ifUnknownProtos represents the number of unknown protocol packets received by the agent on that interface, and ifInOctets represents the total number of bytes received by the agent on that interface. For example, to determine if ifSpeed (304) is available, the Monitoring System (300) puts the Object Identifier (OID) 1.3.6.1.2.1.2.2.1.5 into the GETNEXT request. If the agent (302) supports the management object, one of the management objects in the response (303) will contain the base OID 1.3.6.1.2.1.2.2.1.5. The rest of that OID would represent the first instance supported (i.e. usually would be 1). If the agent (302) did not support the management object IfSpeed, no OID with a base of 1.3.6.1.2.1.2.2.1.5 would be returned.

The adaptive polling facility helps to determine if a particular instance exists on agent (302). For example, to poll the instance representing IfIndex 2 for IfSpeed a conventional monitoring system without adaptive polling would use an SNMP GET request for the fully qualified OID 1.3.6.1.2.1.2.2.1.5.2. If the management object was not supported by agent (302), it would respond with an error and/or NULL values in the response (303). In contrast, an adaptive polling system (300) may create a GETNEXT request using the instance expected directly before it (the OID 1.3.6.1.2.1.2.2.1.5.1). According to the SNMP protocol standard, for a GETNEXT response, the agent (302) must include the next supported object, in lexicographical order. If ifSpeed (304) is supported by the agent (302), the response (303) includes the OID 1.3.6.1.2.1.2.2.1.5.2. If this OID is not present, the adaptive polling system determines that the agent (302) does not support ifSpeed for IfIndex 2. The advantage to using SNMP GETNEXTs over an SNMP GET request is that in one simple request/response communication the monitoring system can determine what is supported without getting timeouts, error responses and being forced to perform extra requests.

Figure 4:
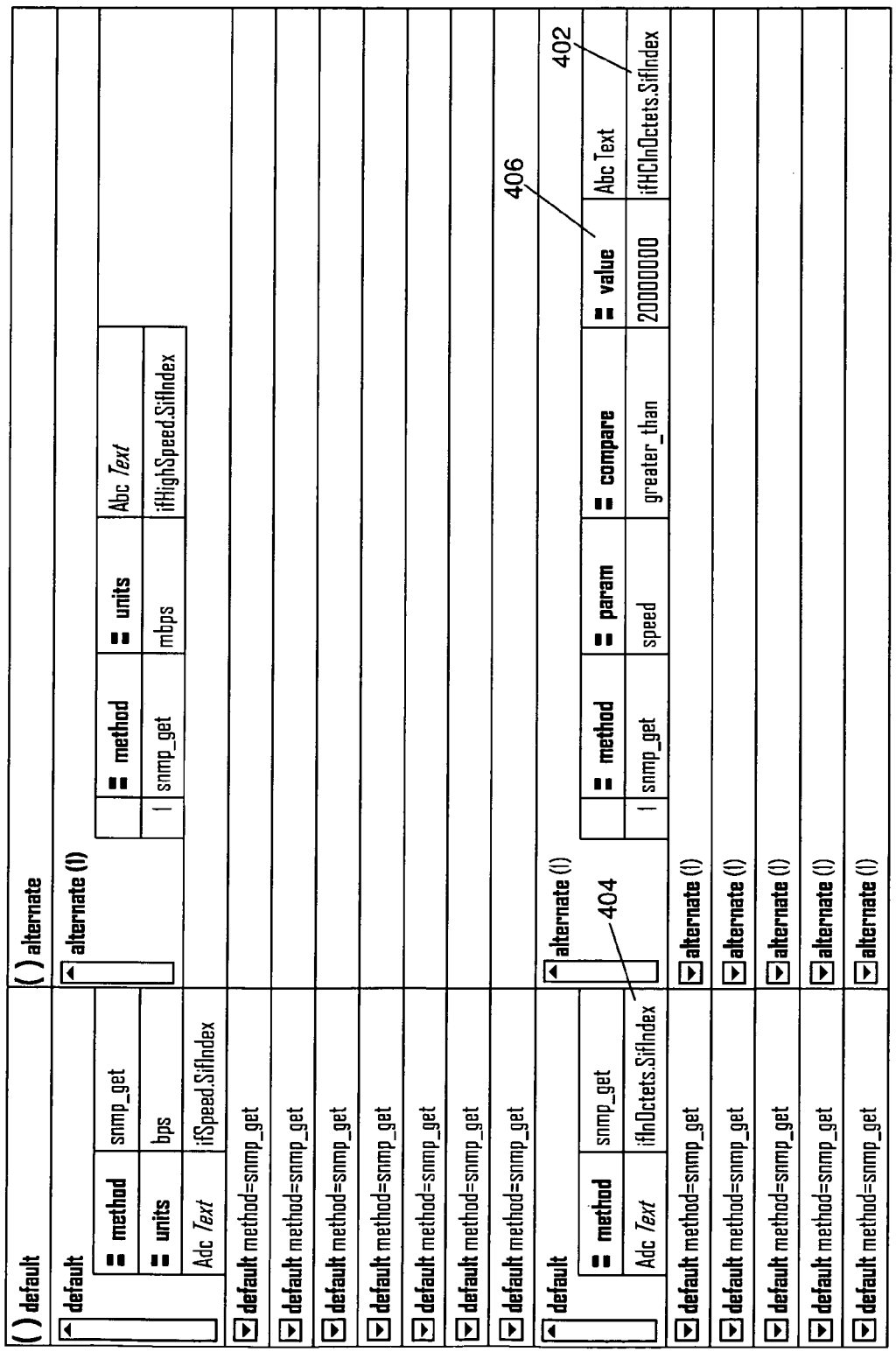
FIG. 4 depicts an exemplary configuration file.

The majority of conventional network management monitoring systems suffer from configuration bloat, specifically because there is no "adaptive" polling mechanism nor is there a way for the monitoring system to determine which variables should be polled over another. This choice is usually left to a "discovery" mechanism, which creates the configuration and assigns a number of different types of configuration files to different elements to be monitored based on the supported variables in the agent and the underlying technologies being polled for the specific instance. For example, the interfaces of a router may be polled by a network monitoring system using a variety of different hard-coded poll configurations since some interfaces may not support certain variables like ifInUnknownProtos or some interfaces may have different speeds, thus requiring the polling of different variables for speed (e.g. polling IfHigh-Speed instead of IfSpeed). In contrast, the adaptive polling facility simplifies the discovery process. Multiple interfaces may be polled using the same configuration file. The poller automatically determines which variables to poll based on the definition of a "SNMP MIB2 INTERFACE" and a complex set of rules that are defined for it. For example, FIG. 4 depicts a configuration file that specifies that that a certain variable (ifHCInOctets) (402) will be polled over another variable (ifInOctets) (404), if the value of a third variable (ifSpeed) (406), matches a specified criteria (the speed is greater than 20 Mbs).

Figure 5:
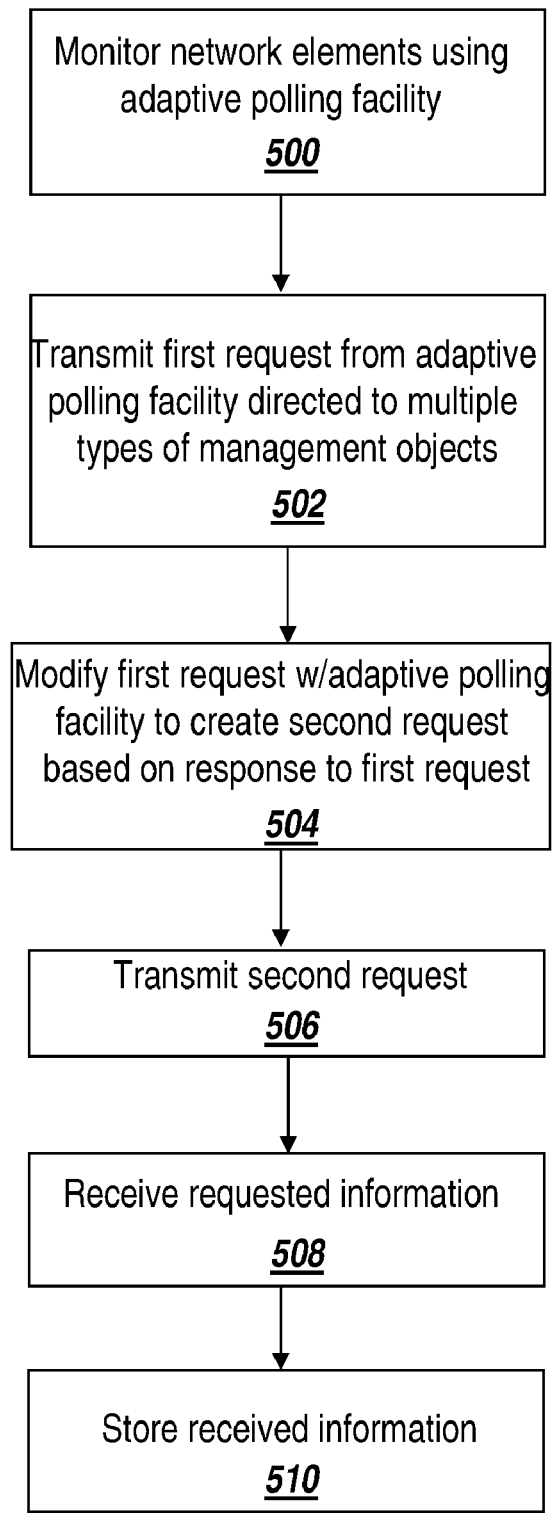
FIG. 5 depicts an exemplary sequence which may be performed by the adaptive polling facility to dynamically modify polling requests.

One exemplary sequence for adaptively polling different types of management objects is depicted in FIG. 5. A network monitoring system may monitor network elements using the adaptive polling facility described herein (step 500). The adaptive polling facility may transmit a first request that is directed to multiple types of management objects for information about one or more network elements (step 502). The first request may be transmitted directly to network elements or may be sent to agents representing the network elements. The response to the first request may be analyzed by the adaptive polling facility to identify which types of management objects are available. The adaptive polling facility may dynamically modify the first request to create a second request that is targeted to a select subset of the types of management objects to which the first request was directed (step 504). The second request may then be transmitted (step 506). Information received in response to the second request (step 508) may then be stored by the network monitoring system (step 510).

In order for a poller to scale to very large amounts of monitored elements the performance of a poller is tantamount. The poller (100) must constantly monitor the conversation (102) with the device (101) it is querying. If the device (100) starts to become slow to respond or requests start to time out, the poller must make changes in order not to lose precious time during the poll cycle. In one exemplary embodiment of the present invention, the adaptive polling facility does this by adaptively changing the rate at which the device is polled, based on the speed at which the device is responding to network requests and the number of requests queued for the device. The adaptive polling facility may also interleave requests to the currently overworked device with queued requests for another device, thus taking advantage of the interim time slice.

To determine if the device is becoming busy several different methods can be used, either separately or in conjunction with one another. One example is to use the ICMP protocol (or some other simple form of communication like TCP/UDP ECHO), to constantly "ping" the agent and check the response times coming back from the ping request. The response times for the first several pings may be stored in an array or some other similar storage construct. Then, a formula for standard deviation is applied to the first several response times and the time for the last received response, to determine if the deviation is larger than a pre-configured amount. If the response time is larger, than the device is slowing responses to polling requests and the adaptive polling facility slows down the speed of the requests to determine the ideal speed at which to query the agent. Once this speed is determined the ideal number of concurrent requests per agent can also be determined.

An alternative method is to keep track of the request/response times from actual queries and apply the same standard deviation heuristic discussed previously with ICMP. If the standard deviation is too large according to a pre-set configuration value, the speed of requests that are sent to the device may be altered by the adaptive polling facility. An exemplary calculation may be represented as follows:

$$\sigma = \sqrt{\frac{1}{N}\sum_{i=1}^{N}(x_i - \bar{x})^2}$$

$\bar{x}$=Mean average of the first several response times and the last response time
N=Number of samples
σ=Standard Deviation Yet another method to determine the ideal number of requests out to any one particular device may include the monitoring of agent timeouts. If the device starts timing out and not responding at all, a timeout waiting period is applied and no requests are sent to that device during that period. Instead of the poller doing nothing, requests are sent to other devices. Once the timeout waiting period expires, if the device is responding normally, queries start again and the timeout period resets, but the number of simultaneous requests for that particular device may be decreased. If the device is still not responding, the timeout waiting period is increased, the number of simultaneous requests for that device is decreased, and the poller continues to query other devices until that period expires. Usually, a device may start responding again after one or more of these types of modifications are made to the poller cycle. Once the device is responding normally the number of requests to it may slowly be increased in order to find the optimal request size and count. But eventually, if it is determined that the device is not going to respond anymore, the device is removed from the queue completely. A message about the device may then be sent to the central management station if one is being utilized.

Figure 6:
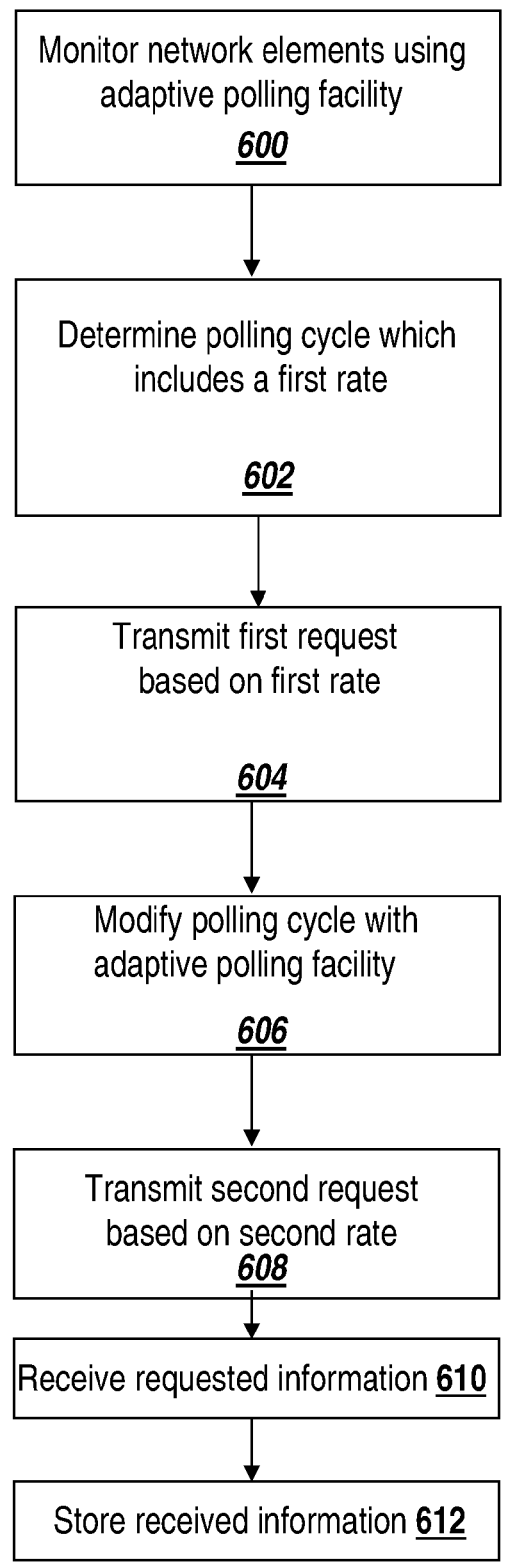
FIG. 6 depicts an exemplary sequence which may be performed by the adaptive polling facility to dynamically modify polling rates.

FIG. 6 depicts an exemplary sequence which may be performed by the adaptive polling facility to dynamically modify polling rates. A network monitoring system may monitor network elements using the adaptive polling facility described herein (step 600). The adaptive polling facility may establish a polling cycle which includes a first rate (step 602). A first request may be transmitted for information about one or more network elements at the first rate set forth in the polling cycle (step 604). Based on the speed of the response to the first request, or the lack thereof, the adaptive polling facility may modify the polling cycle to include a second rate (step 606). A second request may then be transmitted based on the second rate (step 608). Additional requests to other network elements may be interleaved with the second request to increase efficiency. Information received in response to the second request (step 610) may then be stored by the network monitoring system (step 612).

The present invention may be provided as one or more computer-readable programs embodied on or in one or more physical computer-readable mediums. The computer-readable mediums may be a floppy disk, a hard disk, a compact disc, a digital versatile disc, a flash memory card, a PROM, a RAM, a ROM, a magnetic tape, etc. In general, the computer-readable programs may be implemented in any programming language. Some examples of languages that can be used include FORTRAN, C, C++, C#, or JAVA. The software programs may be stored on or in one or more mediums as object code. The code may run in a virtualized environment such as in a virtual machine. Multiple virtual machines running the code may be resident on a single processor.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

I claim:

1. A non-transitory physical computer-readable medium holding computer-executable instructions for using an adaptive polling facility in a network monitoring system, the instructions when executed causing at least one computing device to:

provide an adaptive polling facility operating in conjunction with a network monitoring facility, the network monitoring facility monitoring a plurality of network elements communicating over a network;

programmatically determine whether one or more instances of one or more management objects holding performance statistics related to the performance of at least one of the network elements are supported on an agent for the at least one of the plurality of network elements, the determining:

transmitting a first request from the adaptive polling facility to the agent, the first request containing one or more object IDs (OIDs) for the one or more management objects, examining a response to the first request for an OID associated with a particular instance of the one or more management objects identified in the first request, determine, based on said response:

if an OID associated with a particular instance of the one or more management objects identified in the first request is present in said response, then the instance of the management object is determined to be supported by the agent, if an OID associated with a particular instance of the one or more management objects identified in the first request is not present in said response, then the instance of the management object is determined to not be supported by the agent; and adaptively modify the first request programmatically with the adaptive polling facility so as to formulate a second request, the second request formed by modifying the first request based on the presence or absence of the OID associated with the particular instance in said response, the second request directed to each instance of the management object determined to be supported by the agent and not directed to each instance determined to not be supported by the agent;

programmatically transmit the second request from the adaptive polling facility to the agent;

receive performance statistics related to the performance of the at least one of the network elements from the particular instance of the management object; and store the received performance statistics.

2. The medium of claim 1 wherein the instructions when executed further cause the at least one computing device to:

create and transmit a plurality of individual intermediate requests respectively and uniquely directed to determine whether a plurality of particular instances of management objects holding performance statistics related to the performance of at least one of the network elements is supported on the agent for at least one of the plurality of network elements, the plurality of individual intermediate requests created based upon a lack of response to the first request; and instructions for formulating the second request based upon the responses to the plurality of intermediate requests.

3. The medium of claim 1 wherein the first and second requests are Simple Network Management Protocol (SNMP) requests.

4. A non-transitory physical computer-readable medium holding computer-executable instructions for using an adaptive polling facility in a network monitoring system, the instructions when executed causing at least one computing device to:

provide an adaptive polling facility operating in conjunction with a network monitoring facility, the network monitoring facility monitoring a plurality of network elements communicating over a network, the adaptive polling facility programmatically determining whether one or more instances of one or more management objects holding performance statistics related to the performance of at least one of the network elements are supported on an agent for the at least one of the plurality of network elements;

determine a poll cycle that includes a first rate at which to send a polling request from the adaptive polling facility to a network element;

transmit a first request from the adaptive polling facility to the network element based on the first rate;

adaptively modify the polling cycle with the adaptive polling facility so as to formulate an amended polling cycle with a second rate at which to send a polling request from the adaptive polling facility to the network element, the second rate chosen based upon at least one of a response time to the first request and a number of queued requests awaiting transmission to the network element;

programmatically transmit a second request from the adaptive polling facility to the network element based on the second rate;

receive performance statistics related to the performance of the at least one of the network elements in response to the second request; and store the received performance statistics.

5. The medium of claim 4 wherein the second rate is slower than the first rate.

6. The medium of claim 4 wherein the second rate is faster than the first rate.

7. The medium of claim 4, wherein the instructions when executed further cause the at least one computing device to:

receive a timeout for the first request; and interleave a request for information to a second network element with the second request.

8. A method of using an adaptive polling facility in a network monitoring system, comprising:

providing an adaptive polling facility operating in conjunction with a network monitoring facility, the network monitoring facility monitoring a plurality of network elements communicating over a network;

programmatically determine whether one or more instances of one or more management objects holding performance statistics related to the performance of at least one of the network elements are supported on an agent for the at least one of the plurality of network elements, the determining:

transmitting a first request from the adaptive polling facility to the agent, the first request containing one or more object IDs (OIDs) for the one or more management objects, and examining a response to the first request for an OID associated with a particular instance of the one or more management objects identified in the first request, determining based on said response:

if an OID associated with a particular instance of the one or more management objects identified in the first request is present in said response, then the instance of the management object is determined to be supported by the agent, if an OID associated with a particular instance of the one or more management objects identified in the first request is not present in said response, then the instance of the management object is determined to not be supported by the agent; and adaptively modifying the first request programmatically with the adaptive polling facility so as to formulate a second request, based on the presence or absence of the OID associated with the particular instance in said response, the second request directed to each instance of the management object determined to be supported by the agent and not directed to each instance determined to not be supported by the agent;

programmatically transmitting the second request from the adaptive polling facility to the agent;

receiving performance statistics related to the performance of the at least one of the network elements from the particular instance of the management object; and storing the received performance statistics.

9. The method of claim 8 wherein modifying the first request further comprises:

creating and transmitting a plurality of individual intermediate requests respectively and uniquely directed to determine whether a plurality of particular instances of management objects holding performance statistics related to the performance of at least one of the network elements is supported on the agent for at least one of the plurality of network elements, the plurality of individual intermediate requests created based upon a lack of response to the first request; and formulating the second request based upon the responses to the plurality of intermediate requests.

10. The method of claim 8 wherein the first and second requests are Simple Network Management Protocol (SNMP) requests.

11. A method for using an adaptive polling facility in a network monitoring system, comprising:

providing an adaptive polling facility operating in conjunction with a network monitoring facility, the network monitoring facility monitoring a plurality of network elements communicating over a network, the adaptive polling facility programmatically determining whether one or more instances of one or more management objects holding performance statistics related to the performance of at least one of the network elements are supported on an agent for the at least one of the plurality of network elements;

determining a poll cycle that includes a first rate at which to send a polling request from the adaptive polling facility to a network element;

programmatically transmitting a first request from the adaptive polling facility to the network element based on the first rate;

adaptively modifying the polling cycle with the adaptive polling facility so as to formulate an amended polling cycle with a second rate at which to send a polling request from the adaptive polling facility to the network element, the second rate chosen based upon at least one of a response time to the first request and a number of queued requests awaiting transmission to the network element;

programmatically transmitting a second request from the adaptive polling facility to the network element based on the second rate;

receiving performance statistics related to the performance of the at least one of the network elements in response to the second request; and storing the received performance statistics.

12. The method of claim 11 wherein the second rate is slower than the first rate.

13. The method of claim 11 wherein the second rate is faster than the first rate.

14. The method of claim 11, further comprising:
receiving a timeout for the first request; and
interleaving a request for information to a second network element with the second request.

* * * * *